(12) United States Patent
Takii et al.

(10) Patent No.: US 11,034,285 B2
(45) Date of Patent: Jun. 15, 2021

(54) VEHICLE LAMP AND LIGHTING CONTROL METHOD THEREOF

(71) Applicant: KOITO MANUFACTURING CO., LTD., Tokyo (JP)

(72) Inventors: Naoki Takii, Shizuoka (JP); Masatsugu Murayama, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/450,021

(22) Filed: Jun. 24, 2019

(65) Prior Publication Data

US 2020/0047661 A1 Feb. 13, 2020

(30) Foreign Application Priority Data

Aug. 10, 2018 (JP) .............................. JP2018-151020

(51) Int. Cl.
*B60Q 1/08* (2006.01)
*F21S 41/675* (2018.01)
*F21S 41/32* (2018.01)
*F21Y 115/10* (2016.01)

(52) U.S. Cl.
CPC .............. *B60Q 1/085* (2013.01); *F21S 41/32* (2018.01); *F21S 41/675* (2018.01); *B60Q 2300/42* (2013.01); *B60Q 2300/45* (2013.01); *F21Y 2115/10* (2016.08)

(58) Field of Classification Search
CPC .......... B60Q 1/085; F21S 41/675; F21S 41/32
See application file for complete search history.

(56) References Cited

U.S. PATENT DOCUMENTS

| 2013/0038736 A1 | 2/2013 | Yamamura |
| 2017/0067609 A1 | 3/2017 | Ichikawa et al. |
| 2017/0159903 A1 | 6/2017 | Yamamura |
| 2017/0159904 A1 | 6/2017 | Yamamura |

(Continued)

FOREIGN PATENT DOCUMENTS

| CN | 102844616 A | 12/2012 |
| CN | 106104143 A | 11/2016 |

(Continued)

OTHER PUBLICATIONS

English translation of JP 2012-224317A (Year: 2012).*

(Continued)

*Primary Examiner* — Anne M Hines
(74) *Attorney, Agent, or Firm* — Sughrue Mion, PLLC (57) ABSTRACT

A vehicle lamp and a lighting control method thereof which prevent senses of incongruity and discomfort when a light scanning type lamp is turned on. The vehicle lamp includes a first lamp (a low beam lamp unit) 2 configured to illuminate a required area when turned on, a second lamp (a high beam lamp unit) 3 configured to illuminate an area different from the required area when turned on, and a lighting control device 5 configured to control lighting of the first lamp and the second lamp. The second lamp is configured as a light scanning type lamp including a light source 31 and a scanning means 32 (a motor 34, a rotating mirror 35) configured to scan light emitted from the light source. The lighting control device drives the scanning means of the second lamp when the first lamp is turned on.

6 Claims, 8 Drawing Sheets

(56) References Cited

U.S. PATENT DOCUMENTS

| | | | |
|---|---|---|---|
| 2017/0185855 A1 | 6/2017 | Yamamura | |
| 2017/0282786 A1 | 10/2017 | Toda et al. | |
| 2020/0010012 A1 | 1/2020 | Ichikawa et al. | |
| 2020/0047661 A1 | 2/2020 | Takii et al. | |
| 2020/0238892 A1 | 7/2020 | Maruyama et al. | |
| 2020/0340639 A1 | 10/2020 | Yamamura | |

FOREIGN PATENT DOCUMENTS

| | | | | |
|---|---|---|---|---|
| CN | 109668116 A | | 4/2019 | |
| CN | 210373268 U | | 4/2020 | |
| EP | 2 559 935 A1 | | 2/2013 | |
| EP | 3 287 319 A1 | | 2/2018 | |
| JP | 2012224317 A | * | 11/2012 | ............ F21S 41/663 |
| WO | 2016/104319 A1 | | 6/2016 | |
| WO | 2019/073994 A1 | | 4/2019 | |

OTHER PUBLICATIONS

Search Report and Written Opinion dated Mar. 2, 2021 by the France Patent Office in counterpart France Patent Application No. 1908870.

Office Action dated Mar. 31, 2021 by the State Intellectual Property Office of P.R. China in counterpart Chinese Patent Application No. 201910724735.1.

* cited by examiner

VEHICLE LAMP AND LIGHTING CONTROL METHOD THEREOF

CROSS-REFERENCE TO RELATED APPLICATIONS

This application is based on and claims priority under 35 USC 119 from Japanese Patent Application No. 2018-151020 filed on Aug. 10, 2018.

TECHNICAL FIELD

The present invention relates to a vehicle lamp which performs a light scanning type illumination and a lighting control method thereof.

BACKGROUND ART

In order to enhance a safety traveling performance of a vehicle such as an automobile, there has been proposed a technique for detecting an object such as a preceding vehicle, an oncoming vehicle, or a pedestrian in front of the automobile and controlling light distribution so as not to dazzle a detected object. For example, an adaptive driving beam (ADB) light distribution control of an automobile is a light distribution control which does not selectively illuminate an object existing in an area other than an illumination area of a low beam light distribution, in particular, an area above a cut-off line of the low beam light distribution. In order to realize the ADB light distribution control, a light scanning type lamp is adopted.

As a lamp which performs a light scanning type illumination (hereinafter, referred to as a light scanning lamp), a lamp using a scanning mirror which performs light illumination while changing an illumination direction of light emitted from a light source has been proposed. For example, in WO 2016/104319, a rotating mirror (rotating reflector) which reflects light of a light source is rotationally driven by a motor, so that a reflection angle of the rotating mirror is changed, and the light illumination direction is changed.

SUMMARY

In WO 2016/104319, in order to have an illumination to a desired area in the ADB light distribution control, it is necessary to match the light emission from the light source and a rotation timing of the rotating mirror, but a predetermined rise time is required until a rotational speed of the motor which drives the rotating mirror is stabilized. Therefore, during an initial rise time during which the light scanning lamp is turned on, flickering of the illumination occurs with a change in the rotational speed of the motor, causing a driver to feel incongruity and discomfort.

With respect to such a problem, in the prior application (JP-A-2017-199342) previously filed by the present applicant, there has been proposed a technique of continuing the rotation of the rotating mirror until a predetermined time elapses when a first lamp unit (light scanning lamp) is turned off. Accordingly, when the first lamp unit is turned off, the rotating mirror is maintained at a predetermined rotational speed as long as the first lamp unit is turned on again within the predetermined time, and thus it is possible to prevent the senses of incongruity and discomfort as described above.

The prior application has also been proposed a technique of rotating the rotating mirror of the first lamp unit when the second lamp unit which is not a scanning type lamp illuminates. However, in this prior application, as for the timing at which the rotation of the rotating mirror is started, a case of an illumination instruction in the first lamp unit and a case of an illumination instruction in the second lamp unit are mixed. Therefore, when turning-on is performed in which the rotating mirror is rotated based on the illumination instruction of the first lamp unit, there are cases where the senses of incongruity and discomfort which occur before the rotational speed of the rotating motor stabilizes cannot be always solved, and further improvement is required.

An object of the present invention is to provide a vehicle lamp and a lighting control method thereof in which senses of incongruity and discomfort when a light scanning lamp is turned on are prevented.

According to the present invention, there is provided a vehicle lamp including:

a first lamp configured to illuminate a required area when turned on;

a second lamp configured to illuminate an area different from the required area when turned on; and a lighting control means configured to control lighting of the first lamp and the second lamp, wherein the second lamp includes a light source and a scanning means configured to scan light emitted from the light source, and the lighting control means drives the scanning means of the second lamp when the first lamp is turned on.

According to the present invention, a lighting control method for a vehicle lamp, the vehicle lamp including:
  a first lamp configured to illuminate a required area when turned on; and
  a second lamp configured to illuminate an area different from the required area when turned on, and including a light source and a scanning means configured to scan light emitted from the light source, the method comprising:
  driving the scanning means of the second lamp when the first lamp is turned on.

In the vehicle lamp and the lighting control method thereof according to the present invention, for example, the first lamp is configured as a low beam lamp unit which performs an illumination with a low beam light distribution, and the second lamp is configured as a high beam lamp unit which illuminates an area different from an area illuminated with the low beam light distribution. In addition, the scanning means includes a motor and a rotating mirror which is rotationally driven by the motor and changes a reflection angle of light from the light source as a rotational position thereof changes, and drives the motor when the first lamp is turned on.

According to the present invention, since the scanning means of the second lamp is driven when the first lamp is turned on, the scanning means is set to a state of instantaneously performing a predetermined scanning when the second lamp is turned on. Accordingly, even when the second lamp is turned on instantaneously, an illumination without the senses of incongruity and discomfort can be realized.

DESCRIPTION OF EMBODIMENTS

Figure 1:
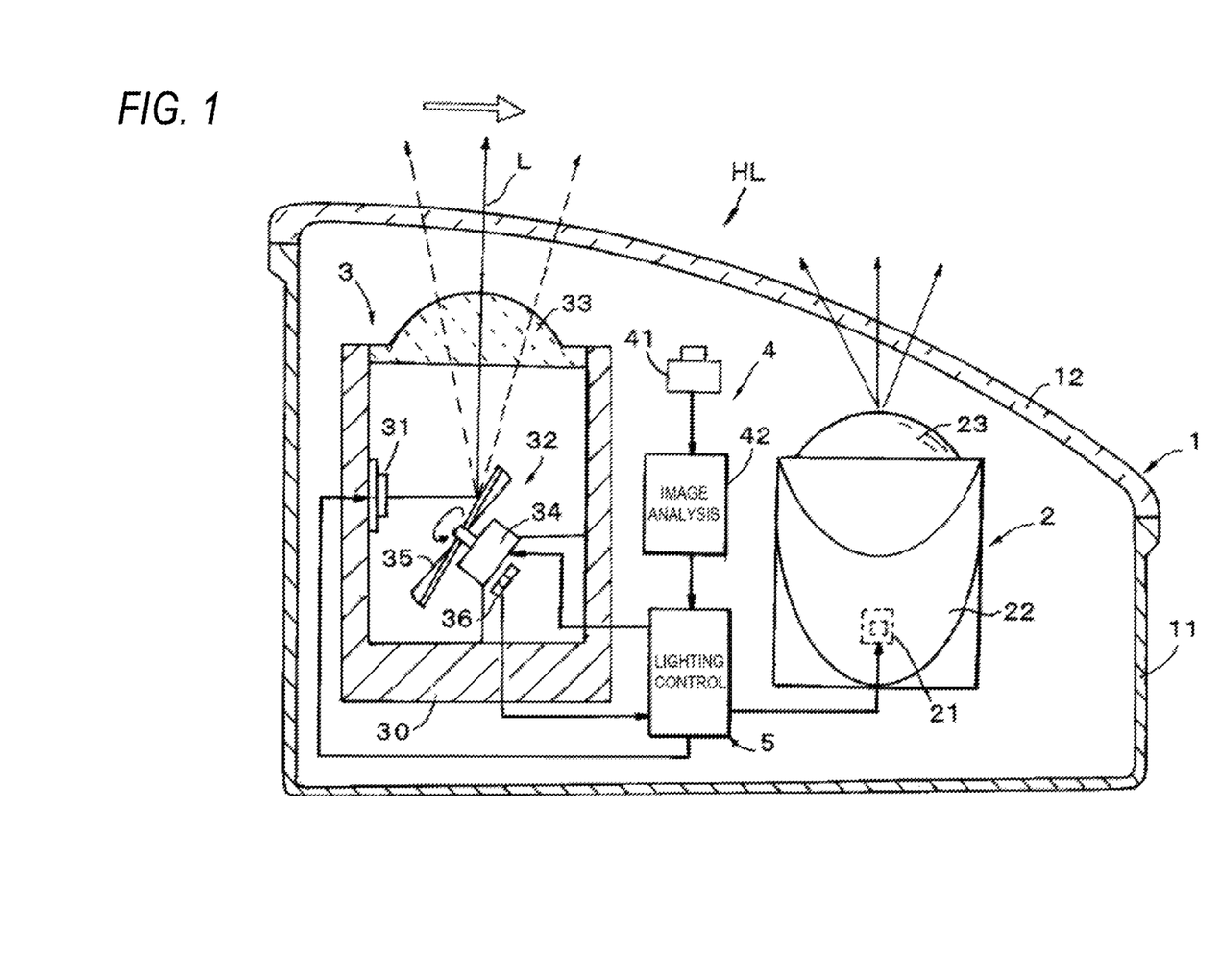
FIG. 1 is a schematic horizontal sectional view of a head lamp of an automobile to which the present invention is applied.

Next, an embodiment of the present invention will be described with reference to the drawings. FIG. 1 is a schematic horizontal sectional view of a head lamp HL of an automobile to which the present invention is applied. The head lamp HL includes a lamp housing 1 configured by a lamp body 11 and a translucent front cover 12, and a low beam lamp unit 2 and a high beam lamp unit 3 mounted in the lamp housing 1. In the following description, a front-rear direction is a direction based on front-rear directions of the automobile and a lamp.

The low beam lamp unit 2 is a first lamp in the present invention, is configured as a projector type lamp unit, and includes a first white LED (light emitting diode) 21 used as a light source configured to emit white light, a reflector 22 configured to reflect the white light emitted from the first white LED 21 in a light collecting state, and a projection lens 23 configured to project the white light collected by the reflector 22 to a front area.

Figure 2A:
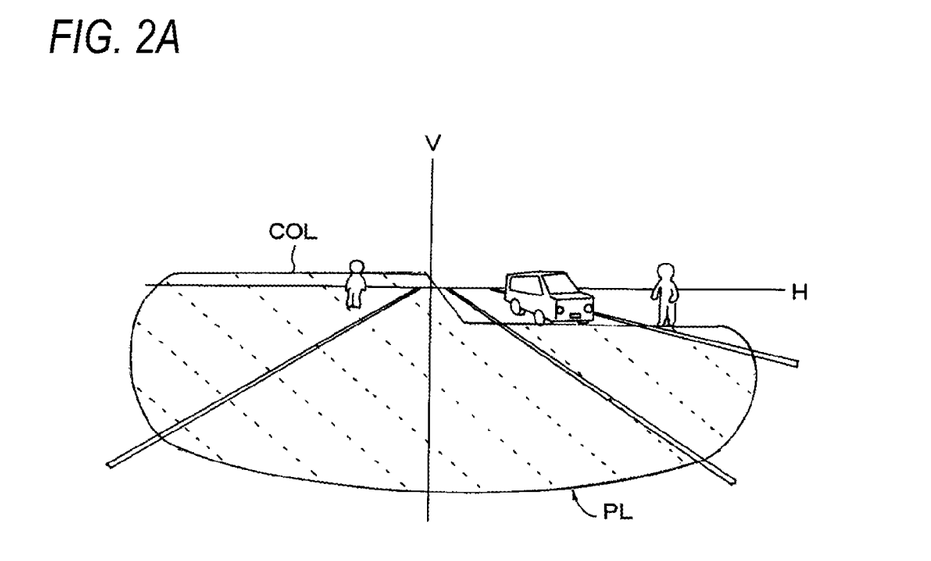
FIG. 2A is a light distribution characteristic diagram of a low beam light distribution.

As shown in a light distribution characteristic diagram of FIG. 2A, the low beam lamp unit 2 has a cut-off line COL extending substantially along a horizontal line H of the front area of the automobile, and provides a low beam light distribution illumination which illuminates an area (upper left broken line area) PL below the cut-off line COL. The cut-off line COL has different heights between a right side (oncoming lane side) and a left side (own lane side) of a vertical line V.

The high beam lamp unit 3 is a second lamp in the present invention, and is configured as a light scanning type lamp unit with an ADB light distribution control. The high beam lamp unit 3 includes a second white LED 31 configured to emit white light, a scanning means 32 configured to reflect the white light emitted from the second white LED 31, and deflects a reflection direction in a horizontal direction, and a projection lens 33 configured to project the reflected white light toward the front area of the automobile, and these are attached to a heat sink 30.

The scanning means 32 includes a brushless motor (hereinafter, referred to as a motor) 34 and a rotating mirror 35 attached to a rotation shaft of the motor 34. The rotating mirror 35 is rotationally driven by the motor 34, and is configured such that an angle in the horizontal direction of a reflecting surface facing the second white LED 31 changes continuously as a rotational position thereof changes. In addition, a hall element 36 is disposed in the motor 34, and a required detection signal is output in accordance with rotational drive of the motor 34.

Figure 2B:
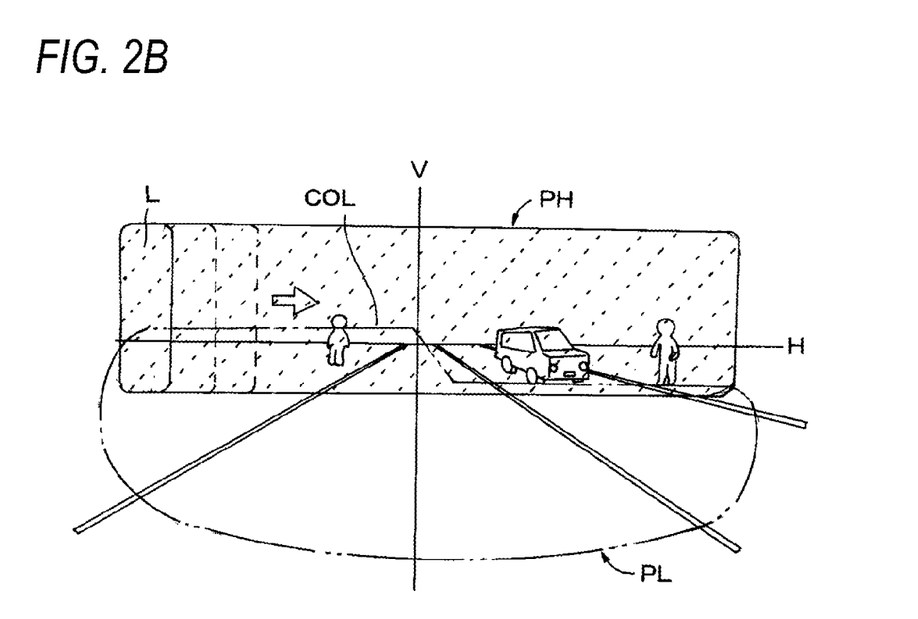
FIG. 2B is a light distribution characteristic diagram of a high beam light distribution.

In the high beam lamp unit 3, white light (white beam) L from the second white LED 31 is repeatedly scanned in the horizontal direction by the rotation of the rotating mirror 35, and as shown in FIG. 2B, by the scanning, is projected onto an ADB high beam light distribution area PH in an area (upper right broken line area) above the cut-off line COL of the low beam light distribution area PL to perform an illumination. As will be described later, when a light emitting timing of the second white LED 31 is controlled by an ADB high beam light distribution control, the illumination to a part of the ADB high beam light distribution area PH is stopped, and the ADB high beam light distribution control is performed.

An object detection device 4 is mounted in the lamp housing 1. The object detection device 4 includes an image pickup element 41 which picks up an image of the front area of the automobile, and an image analysis part 42 which analyzes the image picked up by the image pickup element 41 to detect an object. When there is an object in the front area of the automobile, the object is picked up by the image pickup element 41 and detected by the image analysis part 42. Accordingly, position information or the like including a position and a direction of the object with respect to the automobile is detected.

Further, a lighting control device 5 is mounted in the lamp housing 1, and is connected to the first white LED 21 of the low beam lamp unit 2, the second white LED 31 of the high beam lamp unit 3, and the motor 34 and the hall element 36 of the high beam lamp unit 3. In addition, the lighting control device 5 is also connected to the image analysis part 42 in the object detection device 4.

Figure 3:
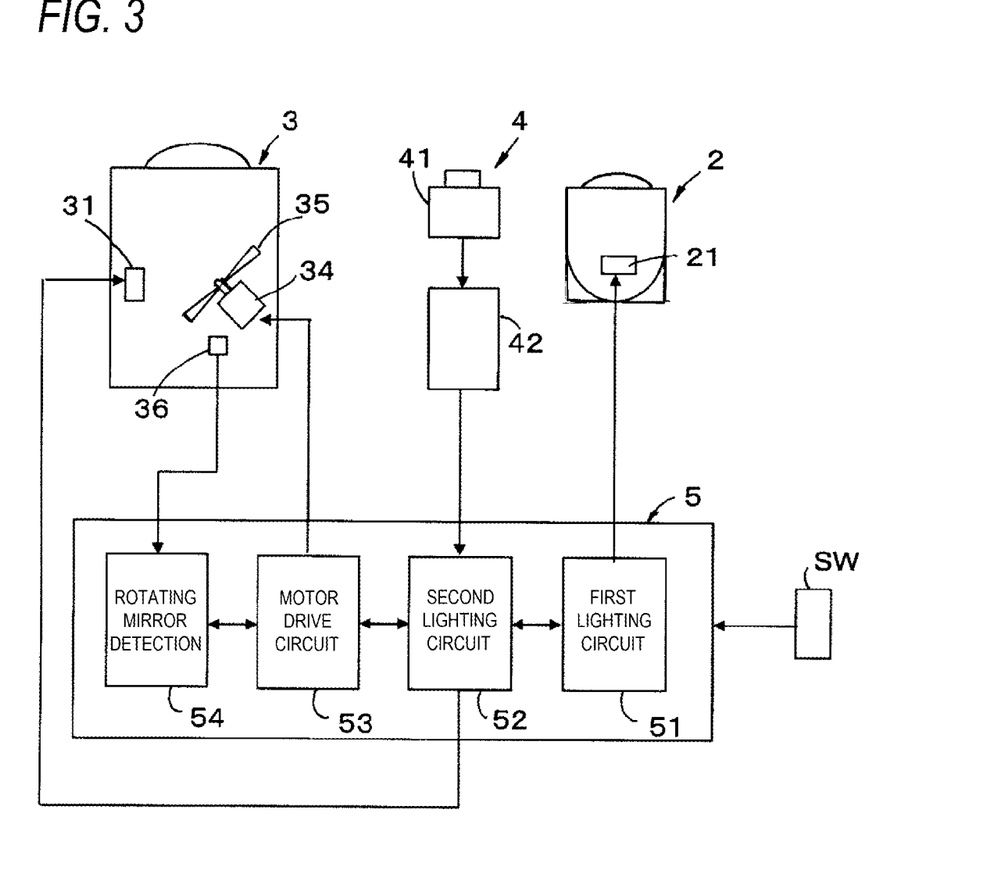
FIG. 3 is a block configuration diagram of a lighting control device.

FIG. 3 is a block configuration diagram of the lighting control device 5. The lighting control device 5 includes a first lighting circuit part 51, a second lighting circuit part 52, a motor drive circuit part 53, and a rotating mirror detection part 54. The first lighting circuit part 51 controls light emission of the first white LED 21 of the low beam lamp unit 2. The second lighting circuit part 52 controls light emission of the second white LED 31 of the high beam lamp unit 3. The motor drive circuit part 53 controls the rotation of the motor 34 which drives the rotating mirror 35 of the high beam lamp unit 3. The rotating mirror detection part 54 detects a rotational state of the motor 34, that is, a rotational state of the rotating mirror 35, based on the detection signal of the hall element 36 provided in the motor 34.

Among these parts, the motor drive circuit part 53 and the rotating mirror detection part 54 are not necessarily configured integrally with the lighting control device 5, and may be configured independently of each other. In particular, the motor drive circuit part 53 may be disposed in the vicinity of the motor 34, or may be configured integrally with the motor 34.

On the other hand, a lighting switch SW operated by an occupant is connected to the lighting control device 5. By operating the lighting switch SW, it is possible to set two lighting modes, that is, "Lo lighting" which is a lighting mode in a low beam distribution and "ADB-Hi lighting" which is a lighting mode in an ADB high beam distribution.

That is, when the lighting switch SW is set to the "Lo lighting", the first lighting circuit part 51 controls the light emission of the first white LED 21 of the low beam lamp unit 2, and the low beam lamp unit 2 is controlled to be turned on/off. Accordingly, the illumination with the low beam light distribution of FIG. 2A is performed. In addition, in the present invention, the rotation of the motor 34 is controlled by the motor drive circuit part 53 at the same time, and the rotation of the rotating mirror 35 is also controlled.

When the lighting switch SW is set to the "ADB-Hi lighting", in addition to the above-described "Lo lighting" illumination, the second lighting circuit part 52 further controls the light emission of the second white LED 31 of the high beam lamp unit 3. In the second lighting circuit part 52, the illumination with the high beam light distribution shown in FIG. 2B is performed. In addition, an illumination with an ADB light distribution is performed to control the light emitting timing and a luminous intensity of the second white LED 31 of the high beam lamp unit 3, based on the rotational state of the rotating mirror 35 detected by the rotating mirror detection part 54, the position information of the object detected by the object detection device 42, or the like.

In the head lamp of the embodiment, the "Lo lighting" can be independently controlled, but the "ADB-Hi lighting" can be controlled only when the control of the "Lo lighting" is performed. That is, when the illumination with the low beam light distribution with respect to the area PL in FIG. 2A is performed, the illumination with the high beam light distribution with respect to the area PH in FIG. 2B can be performed in addition thereto.

Figure 4:
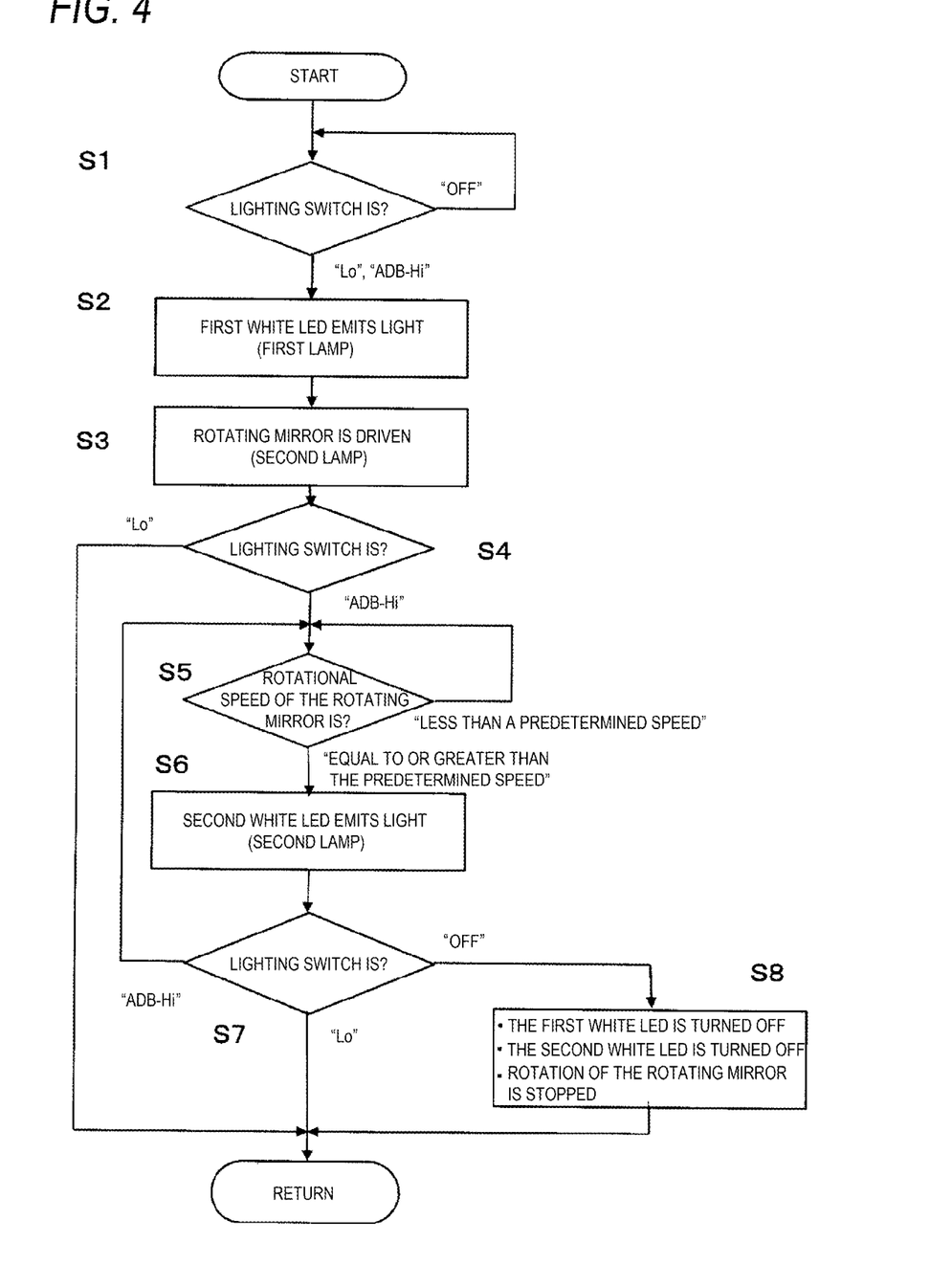
FIG. 4 is a flowchart showing a schematic flow of a lighting control.

The outline of the lighting control of the "Lo lighting" and the "ADB-Hi lighting" in the head lamp HL having the above configuration will be described with reference to a flowchart of FIG. 4. The lighting control device 5 determines a state of the lighting switch SW (S1), and when it is not "OFF", that is, when the "Lo lighting" or the "ADB-Hi lighting" is set, the first lighting circuit part 51 controls the first white LED 21 to emit light (S2), and at the same time, the motor 34 is rotationally driven by the motor drive circuit part 53 (S3). Accordingly, the low beam lamp unit 2 is turned on, and at the same time, only the rotating mirror 35 of the high beam lamp unit 3 is driven.

Next, the lighting control device 5 determines the state of the lighting switch SW (S4), and when the "ADB-Hi lighting" is set, it is determined whether or not a rotational speed of the rotating mirror 35 is equal to or greater than a predetermined speed based on the detection of the rotating mirror detection part 54 (S5). When the rotational speed of the rotating mirror 35 is equal to or greater than the predetermined speed, the second lighting circuit part 52 controls the second white LED 31 to emit light (S6). Accordingly, the high beam lamp unit 3 is turned on, and the illumination in which the light of the second white LED 31 is scanned with the rotating mirror 35 is performed.

Subsequently, the state of the lighting switch SW is determined (S7), a process is returned when the state is the "Lo lighting", the process is returned to a step S5 when it is the "ADB-Hi lighting", and the first white LED 21 and the second white LED 31 are turned off, and the rotation of the rotating mirror 35 is stopped when it is "OFF". As a result, the head lamp HL is turned off.

Figure 5:
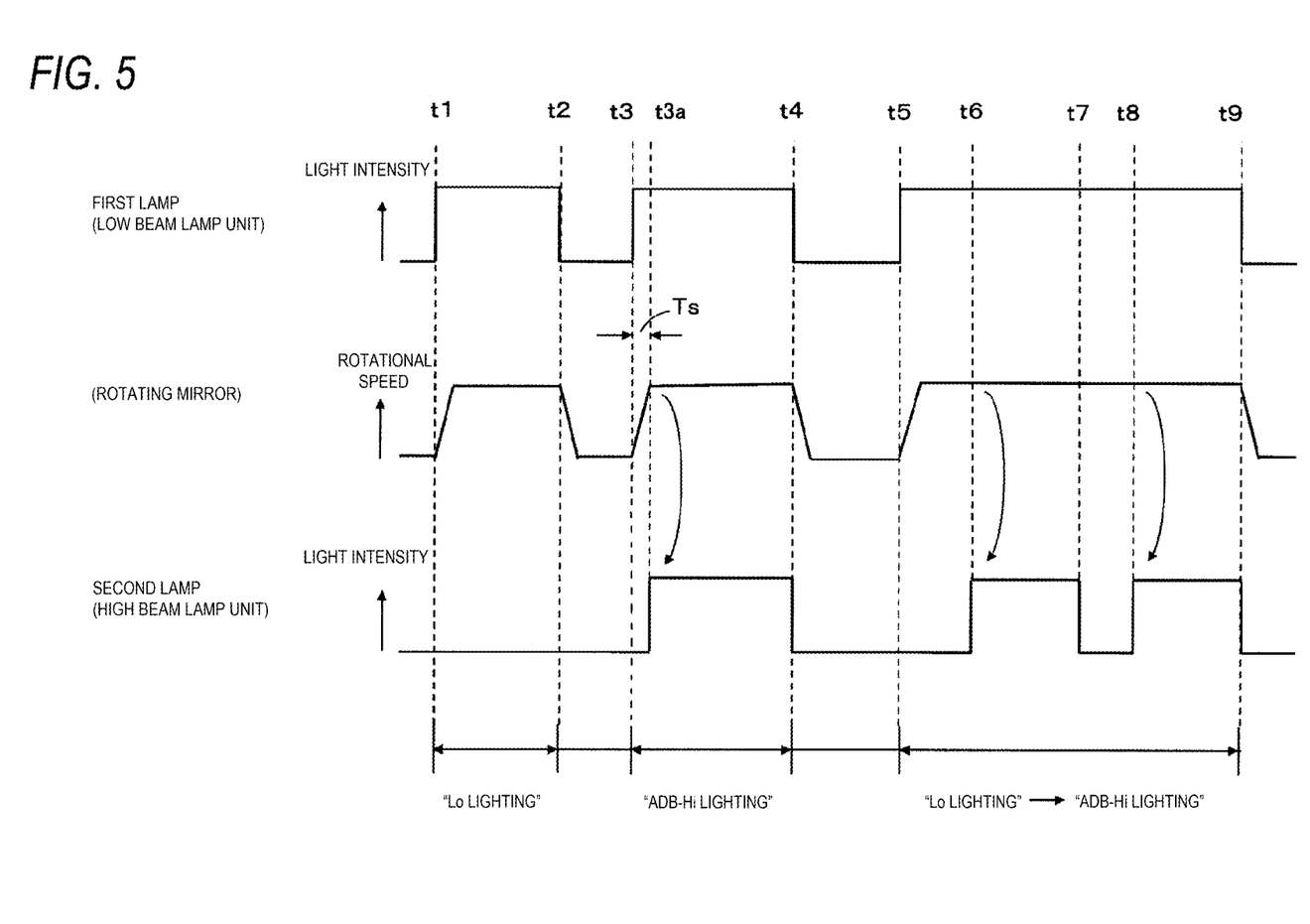
FIG. 5 is a timing diagram for explaining an operation of the lighting control.

FIG. 5 is a timing diagram showing an example of the lighting control. The timing diagram shows, from the top, a lighting state of the low beam lamp unit 2, the rotational state of the rotating mirror 35, and a lighting state of the high beam lamp unit 3. Vertical axes of the two lamp units 2, 3 indicate luminous intensities of the respective white LEDs, and a vertical axis of the rotating mirror 35 indicates the rotational speed thereof "Lo Lighting" Control In FIG. 5, when the occupant (driver) sets the lighting switch SW to the "Lo lighting" at a time point t1, the first lighting circuit part 51 of the lighting control device 5 controls the first white LED 21 to emit the light. Accordingly, the low beam lamp unit 2 is turned on, and the illumination with the low beam light distribution shown in FIG. 2A is performed. At this time, the motor drive circuit part 53 of the lighting control device 5 controls the rotation of the motor 34. Therefore, in the high beam lamp unit 3, the rotating mirror 35 is rotated, but the second white LED 31 does not emit the light, and the illumination by the high beam lamp unit 3 is not performed.

When the lighting switch SW is turned off from the "Lo lighting" at a time point t2, the light emission of the first white LED 21 is stopped by the control of the first lighting circuit part 51, and the low beam lamp unit 2 is turned off. At the same time, the motor drive circuit 53 of the lighting control device 5 stops the rotation of the motor 34, and the rotation of the rotating mirror 35 of the high beam lamp unit 3 is also stopped.

"ADB-Hi Lighting"

In FIG. 5, when the occupant (driver) sets the lighting switch SW to the "ADB-Hi lighting" at a time point t3, the first lighting circuit part 51 of the lighting control device 5 controls the first white LED 21 to emit the light. Accordingly, the low beam lamp unit 2 is turned on, and the illumination with the low beam light distribution shown in FIG. 2A is performed. At the same time, the motor drive circuit part 53 of the lighting control device 5 controls the rotation of the motor 34.

Then, the second lighting circuit part 52 refers to the rotational speed of the rotating mirror 35 detected by the rotating mirror detection part 54, and causes the second white LED 31 of the high beam lamp unit 3 to emit the light at a time point t3a when the rotational speed thereof reaches the predetermined speed. Accordingly, the high beam lamp unit 3 scans the white light of the second white LED 31, and performs the illumination with the ADB high beam light distribution of FIG. 2B.

In this case, since a required rise time Ts is generated from the setting of the lighting switch SW until the rotating mirror 35 reaches the predetermined rotational speed, the illumination with the ADB high beam light distribution is delayed by the rise time Ts. However, by waiting at the rise time Ts, the illumination in a state where the rotational speed of the rotating mirror 35 has not reached the predetermined speed is prevented in advance during an initial period of starting of the illumination of the high beam lamp unit 3, thereby preventing senses of incongruity and discomfort.

In the "ADB-Hi lighting", the object detection device 4 picks up the image of the front area of the automobile by the image pickup element 41, and detects an object from the picked up image by the image analysis part 42. In an example shown in FIG. 6, pedestrians M1, M2 and an oncoming vehicle CAR are detected. When these objects are detected, the second lighting circuit part 52 of the lighting control device 5 controls the light emitting timing and a light intensity of the second white LED 31 (including non-light emission) based on the position (direction) of the object detected from the object detection device 4 and the rotational position of the rotating mirror 35 detected from the rotating mirror detection part 54.

Figure 6:
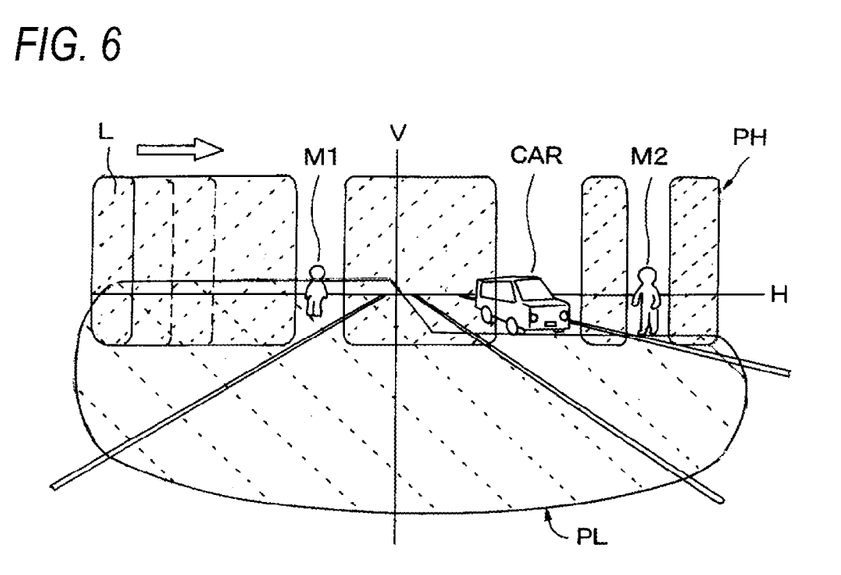
FIG. 6 is a light distribution characteristic diagram for explaining an ADB light distribution.

As shown in FIG. 6, with respect to the ADB high beam light distribution area PH, areas where the objects M1, M2, and CAR exist are not irradiated with the light beam L of the white LED 31, and the illumination by the high beam lamp unit 3 is limited. In the other areas, an illumination at a required light intensity by the light beam L of the white LED 31 is performed. Therefore, the ADB high beam light distribution control is realized in which a visibility of the front area of the automobile is enhanced without dazzling the oncoming vehicle CAR or the pedestrians M1, M2 used as the object.

When the lighting switch SW is turned off from the "ADB-Hi lighting" at a time point t4 in FIG. 5, the low beam lamp unit 2 is turned off by the first lighting circuit part 51. At the same time, the second lighting circuit part 52 stops the light emission of the second white LED 31, the motor drive circuit part 53 stops the rotation of the motor 34, and the high beam lamp unit 3 is turned off.

Switching from "Lo Lighting" to "ADB-Hi Lighting"

In FIG. 5, when the lighting switch SW is set to the "Lo lighting" at a time point t5, that is, when the high beam lamp unit 2 is turned on and the rotating mirror 35 is rotated at the predetermined speed at the same time, when the SW is further switched to the "ADB-Hi lighting" at a time point t6, the second lighting circuit part 52 controls the second white LED 31 of the high beam lamp unit 3 to emit the light. Accordingly, the light of the second white LED 31 is scanned by the rotating mirror 35 to turn on the high beam lamp unit 3, and the illumination with the high beam light distribution shown in FIG. 2B is performed.

At this time, the second lighting circuit part 52 refers to the rotational speed of the rotating mirror 35 detected by the rotating mirror detection part 54 at the time point t6 when the lighting switch SW is switched. However, since the rotating mirror 35 has already started the rotation at the time point t5 when the "Lo lighting" is started, and the rotational speed is controlled to the predetermined speed at the time point t6, the second lighting circuit part 52 immediately controls the second white LED 31 to be turned on. Therefore, the illumination with high beam light distribution which does not cause instantaneously the senses of incongruity and discomfort is realized.

Switching Back from "ADB-Hi Lighting" to "Lo Lighting"

In FIG. 5, when the lighting switch SW is switched from the "ADB-Hi lighting" to the "Lo lighting" at a time point t7, the second lighting circuit part 52 stops the light emission of the second white LED 31, and turns off the high beam lamp unit 3. Accordingly, the state of the "Lo lighting" is returned.

Also in this case, while being controlled to the "Lo lighting", the rotating mirror 35 continues rotating at the predetermined rotational speed under the control of the motor drive circuit part 53. Therefore, even when the lighting switch SW is set to the "ADB-Hi lighting" again at a time point t8 from the state of the "Lo lighting", the control of the high beam light distribution can be shift instantaneously, and at that time, the illumination with the "ADB-Hi lighting" can be realized without causing the senses of incongruity and discomfort.

When the lighting switch SW is turned off from the "ADB-Hi lighting" at a time point t9, the low beam lamp unit 2 is turned off by the first lighting circuit part 51. At the same time, the second lighting circuit part 52 stops the light emission of the second white LED 31, the motor drive circuit part 53 stops the rotation of the motor 34, and the high beam lamp unit 3 is turned off.

As described above, in this embodiment, since the rotating mirror 35 of the high beam lamp unit 3 is rotationally driven simultaneously with the turning on of the low beam lamp unit 2, the rotation of the rotating mirror 35 is continued even when the low beam light distribution by the "Lo lighting" and the ADB high beam light distribution by the "ADB-Hi lighting" are frequently switched. Therefore, in particular, it is not necessary to consider the rise time Ts of the rotating mirror 35 when switching to the "ADB-Hi lighting", the lighting control of the "ADB-Hi lighting" can be performed quickly, and the senses of incongruity and discomfort can be prevented at the same time.

In addition, even when the "Lo lighting" and the "ADB-Hi lighting" are switched at a time interval longer than a first time or a second time proposed in the prior application, since the rotation of the rotating mirror 35 is continued, the lighting control of the "ADB-Hi lighting" can be performed quickly, and the senses of incongruity and discomfort can be prevented at the same time.

Further, in this embodiment, the motor 34 which rotationally drives the rotating mirror 35 generates a so-called inrush current at the start of rotation, and power consumption becomes excessive. However, the total power consumption can be reduced by continuously rotating the motor 34 at the time of the "Lo lighting". In addition, a life of the motor 34 is also affected by the number of repetitions of ON/OFF, which is advantageous in increasing the life of the motor 34 or the rotating mirror 35.

Figure 7:
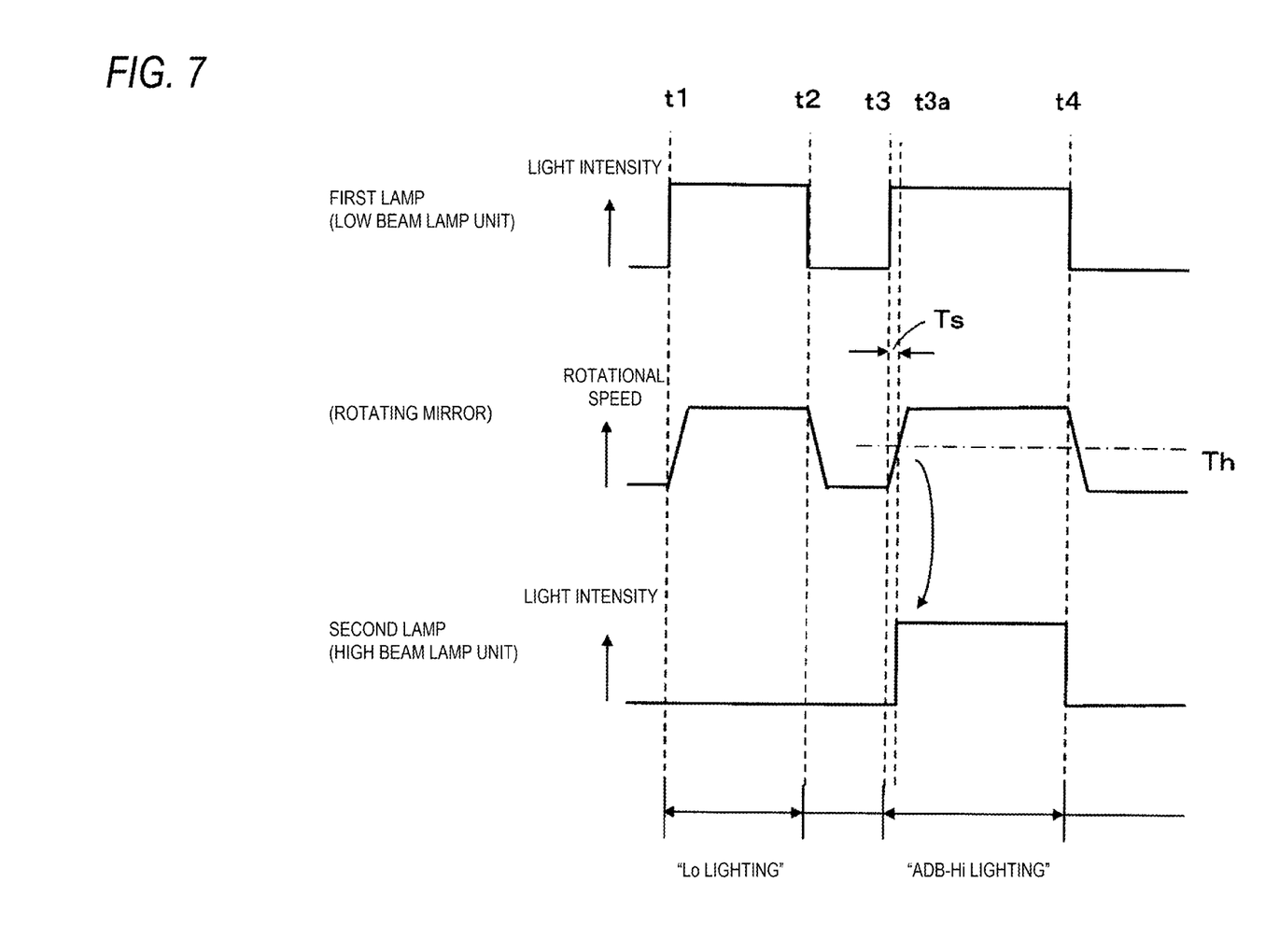
FIG. 7 is a timing diagram for explaining an operation of a lighting control according to a modification.

As shown in FIG. 7, when the "ADB-Hi lighting" is performed based on the rotational speed of the rotating mirror 35, a threshold speed Th may be set at a speed lower than the predetermined rotational speed, and the "ADB-Hi lighting" may be performed when the threshold speed Th is reached. This is because even if the rotational speed of the rotating mirror 35 at the start of lighting is somewhat lower than the predetermined rotational speed, the light distribution is less affected. Accordingly, the rise time Ts can be shortened to enable quick lighting control.

Figure 8:
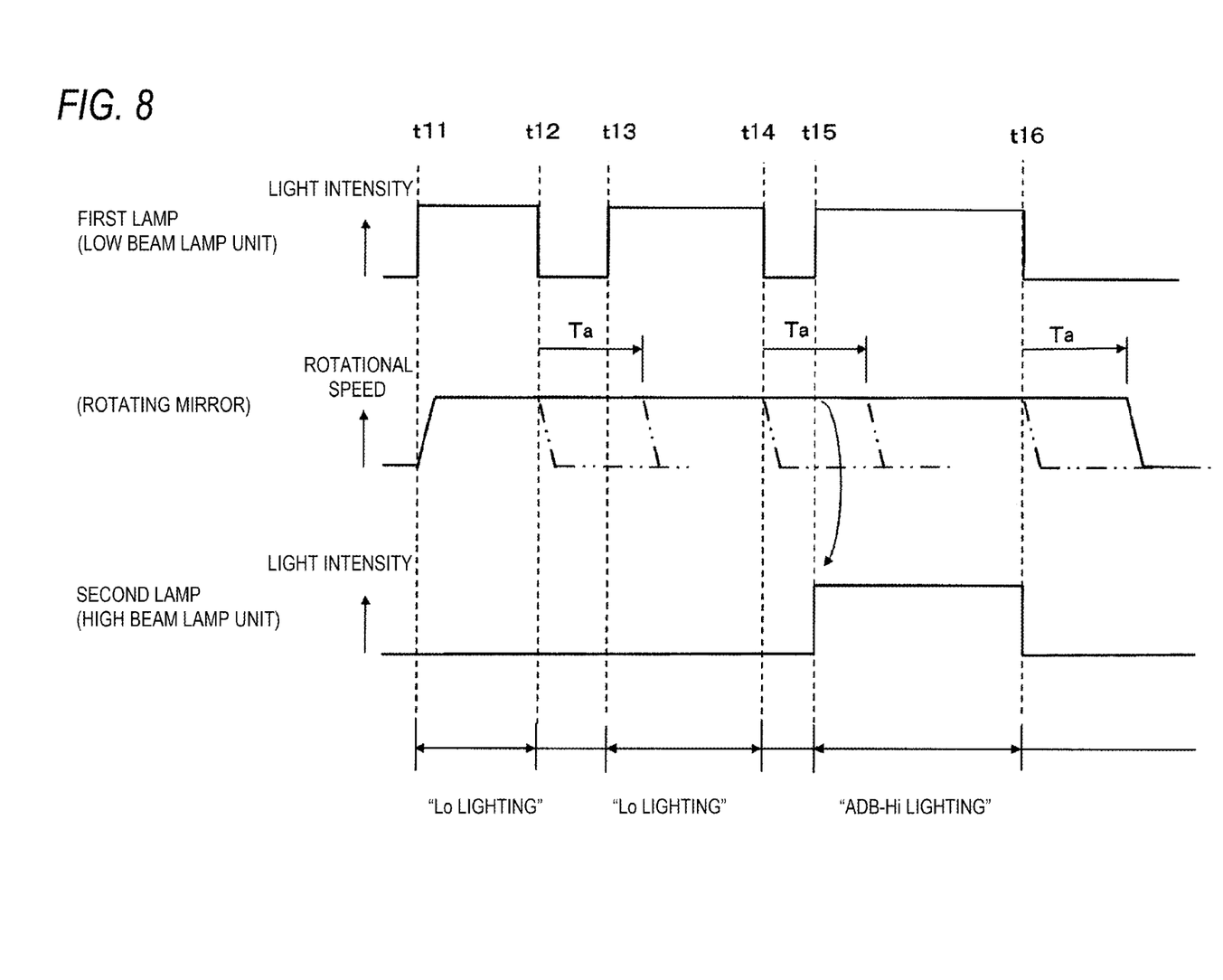
FIG. 8 is a timing diagram for explaining an operation of a lighting control according to another modification.

Here, as shown in a timing diagram of FIG. 8, when the "Lo lighting" control started at a time point t11 is turned off at a time point t12, the rotation of the motor 34, that is, the rotation of the rotating mirror 35 may be continued for a preset additional time Ta. In this way, in a case where the "Lo lighting" is performed again at a time point t13 after a time shorter than the additional time Ta, the next "Lo lighting" control is performed while the rotation of the rotating mirror 35 is continued, and the rotation of the rotating mirror 35 is not frequently stopped.

Even in a case where the "ADB-Hi lighting" is set at a time point t15 during the additional time Ta after a time point t14 when the "Lo lighting" is finished, the rotational speed of the rotating mirror 35 is held at the predetermined speed at this time, so that the illumination with the "ADB-Hi lighting" can be instantaneously realized, and no sense of incongruity and discomfort occurs. The same applies to the case after the "ADB-Hi lighting" is finished at a time point t16.

In this case, the rotational speed of the motor 34 may be reduced during the additional time Ta. Accordingly, the power consumption can be reduced by the reduction of the rotational speed, while the rise time Ts can be shortened when the motor 34 is subsequently started to rotate and driven to the predetermined speed.

The first lamp and the second lamp in the present invention are not limited to the low beam lamp and the high beam lamp described in the embodiment. In particular, the second lamp may be a lamp including a scanning means which scans the light emitted from the light source. Further, when the second lamp is configured as a high beam lamp, it may not be always necessary to perform the ADB light distribution control.

The scanning means according to the present invention is not limited to the rotating mirror described in the embodiment, and the present invention can be applied to any scanning means as long as the scanning means uses a motor or other actuator, which requires a predetermined rise time when starting the light scanning, as a drive source.

In the embodiment, the object detection device 4 is configured integrally with the head lamp HL, but the object detection device may be configured separately from the lamp. In addition, the lighting control device 5 may also be configured separately from the head lamp HL.

The invention claimed is:

1. A vehicle lamp comprising:
   a first lamp configured to illuminate a required area when turned on;
   a second lamp configured to illuminate an area different from the required area when turned on; and
   a lighting control means configured to control lighting of the first lamp and the second lamp,
   wherein the second lamp includes a light source and a scanning means configured to scan light emitted from the light source, and the lighting control means drives the scanning means of the second lamp when the first lamp is turned on, and
   wherein the lighting control means turns on the light source of the second lamp after turning on the first lamp and driving the scanning means.

2. The vehicle lamp according to claim 1
   wherein the lighting control means stops driving the scanning means when the first lamp is turned off.

3. The vehicle lamp according to claim 1,
   wherein the lighting control means continues driving the scanning means for a predetermined additional time when the first lamp is turned off.

4. The vehicle lamp according to claim 1,
   wherein the first lamp is configured as a low beam lamp unit which performs an illumination with a low beam light distribution, and the second lamp is configured as a high beam lamp unit which illuminates an area different from an area illuminated with the low beam light distribution.

5. The vehicle lamp according to claim 1,
   wherein the scanning means includes a motor and a rotating mirror which is rotationally driven by the motor and changes a reflection angle of light of the light source as a rotational position thereof changes, and the lighting control means drives the motor when the first lamp is turned on.

6. The vehicle lamp according to claim 5,
   wherein the lighting control means includes a rotating mirror detection means configured to detect a rotational state of the rotating mirror, and after the first lamp is turned on, the light source of the second lamp is turned on based on the rotational state of the rotating mirror detected by the rotating mirror detection means.

* * * * *